United States Patent
Dao et al.

[19]

[11] Patent Number: 5,940,311
[45] Date of Patent: Aug. 17, 1999

[54] IMMEDIATE FLOATING-POINT OPERAND REFORMATTING IN A MICROPROCESSOR

[75] Inventors: Tuan Q. Dao, Richardson; Rekha Suryanarayana, Plano; Naoki Hayashi, Dallas, all of Tex.

[73] Assignee: Texas Instruments Incorporated, Dallas, Tex.

[21] Appl. No.: 08/847,279

[22] Filed: Apr. 30, 1997

[51] Int. Cl.⁶ ........................................................ G06F 7/38
[52] U.S. Cl. .............................. 364/715.03; 364/748.01
[58] Field of Search .................... 364/715.03, 748.01, 364/748.02, 748.03, 748.04, 748.12, 748.13, 748.16, 748.19

[56] References Cited

U.S. PATENT DOCUMENTS

| | | | |
|---|---|---|---|
| 4,949,291 | 8/1990 | Saini | 364/715.03 |
| 5,523,961 | 6/1996 | Naini | 364/715.03 |
| 5,687,106 | 11/1997 | Schwarz et al. | 364/748.01 |

*Primary Examiner*—Chuong Dinh Ngo
*Attorney, Agent, or Firm*—Robert D. Marshall, Jr.; Gerald E. Laws; Richard L. Donaldson

[57] ABSTRACT

A microprocessor (5) having an on-chip floating-point unit, or FPU, (31) is disclosed. Snoop logic (37) is present in the integer pipeline to detect the presence of floating-point load instructions, in which floating-point operands are retrieved from system main memory or from on-chip cache memory (6, 16$_d$, 18) by load/store units 40. For such operations in which the floating-point operands are of single precision or double precision, immediate formatter (70) receives the retrieved operands on load/store buses (LOAD_DATA0, LOAD_DATA1) and reformats the operands into a higher precision format for use internally by FPU (31). Rebias circuitry (78) is provided within immediate formatter (70) to change the bias of the exponent portion of the reformatted floating-point operands. Selection of the appropriate operand for application to the execution stages (56, 58, 60) of FPU (31) is made by a multiplexer (74) responsive to control signals (BSEL) derived from load/store directives detected by snoop logic (37). The operation of the immediate formatter (70) enables the reformatting of single precision and double precision floating-point operands within the same machine cycle as their receipt on load/store buses (LOAD_DATA0, LOAD_DATA1), thus improving performance of microprocessor (5).

20 Claims, 7 Drawing Sheets

IMMEDIATE FLOATING-POINT OPERAND REFORMATTING IN A MICROPROCESSOR

TECHNICAL FIELD OF THE INVENTION

This invention is in the field of microprocessor integrated circuits, and is more specifically directed to microprocessors with on-chip floating-point execution units.

BACKGROUND OF THE INVENTION

In recent years, many advances have been made in the field of integrated circuits intended for use in data processing systems. One such advance has been the incorporation of dedicated floating-point arithmetic logic onto the same integrated circuit as the general purpose microprocessor typically serving as the central processing unit (CPU) for a personal computer or workstation. Previous to such incorporation, specific floating-point logic was incorporated into microprocessor-based computers by way of a separate microprocessor, generally referred to as a co-processor. These so-called "math coprocessors" typically operated in a slaved fashion relative to the CPU, responding to instructions and operands forwarded thereto by the CPU. The incorporation of floating-point units (FPUs) on-chip with the microprocessor, primarily enabled through advances in manufacturing techniques, has provided improvement in overall system performance by providing access of other on-chip resources (register file, cache, etc.) to the FPU, and by way of the inherently improved ability to communicate operands and control signals with the on-chip FPU.

Multiple techniques are known for implementing on-chip FPUs into microprocessors. As one example, the well-known x86 architecture microprocessors typically treat floating-point units (whether on-chip or as a coprocessor) as a separate processor. Floating-point instructions have been executed in these architectures by the pipeline sending an entire floating-point instruction to the FPU for execution as a whole. Later x86-architecture microprocessors (e.g., the PENTIUM microprocessor available from Intel Corporation) include multiple pipelines, one of which is shared, up to and including one execution stage, by both integer and floating-point instructions. Microprocessors of the so-called "reduced instruction set", or RISC, type have implemented on-chip floating-point units differently from the complex instruction set (CISC) type microprocessors (e.g., of the x86-architecture), by implementing the FPU as an execution unit. RISC processors typically include a logic function known as a scheduler (also known as a completion unit) that controls each of several execution units, including integer arithmetic logic units (ALUs), load/store units, and the floating-point units, to execute single-cycle instructions; in this arrangement, the single-cycle RISC instructions are issued to and executed by the FPU in the same manner as integer instructions are issued to and executed by integer execution units.

In addition to the forwarding or scheduling of the floating-point instructions, each microprocessor having an on-chip FPU must deal with the problem of format conversion for the operands upon which the floating-point instructions are to be executed. As is fundamental in the art, floating-point data words and operands generally include a sign bit, an exponent value (which may include a bias), and a mantissa. However, several different precision levels are available, including, for example, single precision, double precision, and extended precision as defined according to the IEEE 754 floating-point standard. The FPU, or other circuitry within the microprocessor, must of course be able to deal with the reformatting of operands or data words among these various precision formats, considering that operands of various formats may be combined in a floating-point instruction or operation.

However, even though floating-point data words may be represented in thirty-two bits for single precision, sixty-four bits for double precision, and eighty bits for IEEE extended precision data words, typical FPUs are constructed to operate only upon operands in the highest precision level, to save chip area and complexity, with rounding and other circuitry converting the result into the appropriate precision level desired by the program. In these and other situations, on-chip format conversion of the format of floating-point operands must be comprehended in the design of the microprocessor.

Furthermore, conventional x86-architecture microprocessors utilize thirty-two bit internal load/store buses to communicate data from main memory or from on-chip cache memory. This limited bus width for memory accesses requires floating-point data retrieved from memory to undergo format conversion prior to execution of the floating-point instruction. In conventional microprocessors, multiple machine cycles are required for this format conversion, as a first machine cycle is required to register the input operand or operands, followed by reformatting and storing the reformatted results in the next one or more machine cycles. The execution of each floating-point instruction using conventional FPU architecture therefore involves, in most cases, at least one additional machine cycle for the reformatting of floating-point operands retrieved from memory. This reformatting thus, of course, introduces an inefficiency into the implementation of an on-chip floating-point unit.

SUMMARY OF THE INVENTION

The present invention may be implemented into a microprocessor of the x86-architecture type having an on-chip floating-point execution unit (FPU), by providing circuitry that receives operands from memory accesses, and that reformats these operands into a high precision internal floating-point format in the same machine cycle. The circuitry according to the preferred embodiment of the invention includes reformatting circuitry for receiving single and double precision operands from the integer pipeline on at least two internal load/store buses, and for arranging the operands onto a high precision internal FPU bus within the same machine cycle. The reformatting circuitry further has the ability to swap operand position prior to applying the operand to the high precision internal FPU bus, so that mantissa and exponent portions of the operand may be received on separate load/store buses over two machine cycles.

It is therefore an object of the present invention to provide a microprocessor in which an on-chip FPU may begin execution of a reformatted floating-point operand in the same cycle as the operand is received from the integer pipeline of the microprocessor.

It is a further object of the present invention to provide such a microprocessor in which both single-precision and double-precision operands may be immediately reformatted into a high precision internal FPU bus format.

It is a further object of the present invention to provide such a microprocessor in which the high precision internal FPU bus format is extended beyond that available for external communications, as useful for retaining intermediate floating-point results prior to rounding.

DETAILED DESCRIPTION OF THE PREFERRED EMBODIMENT

Figure 1:
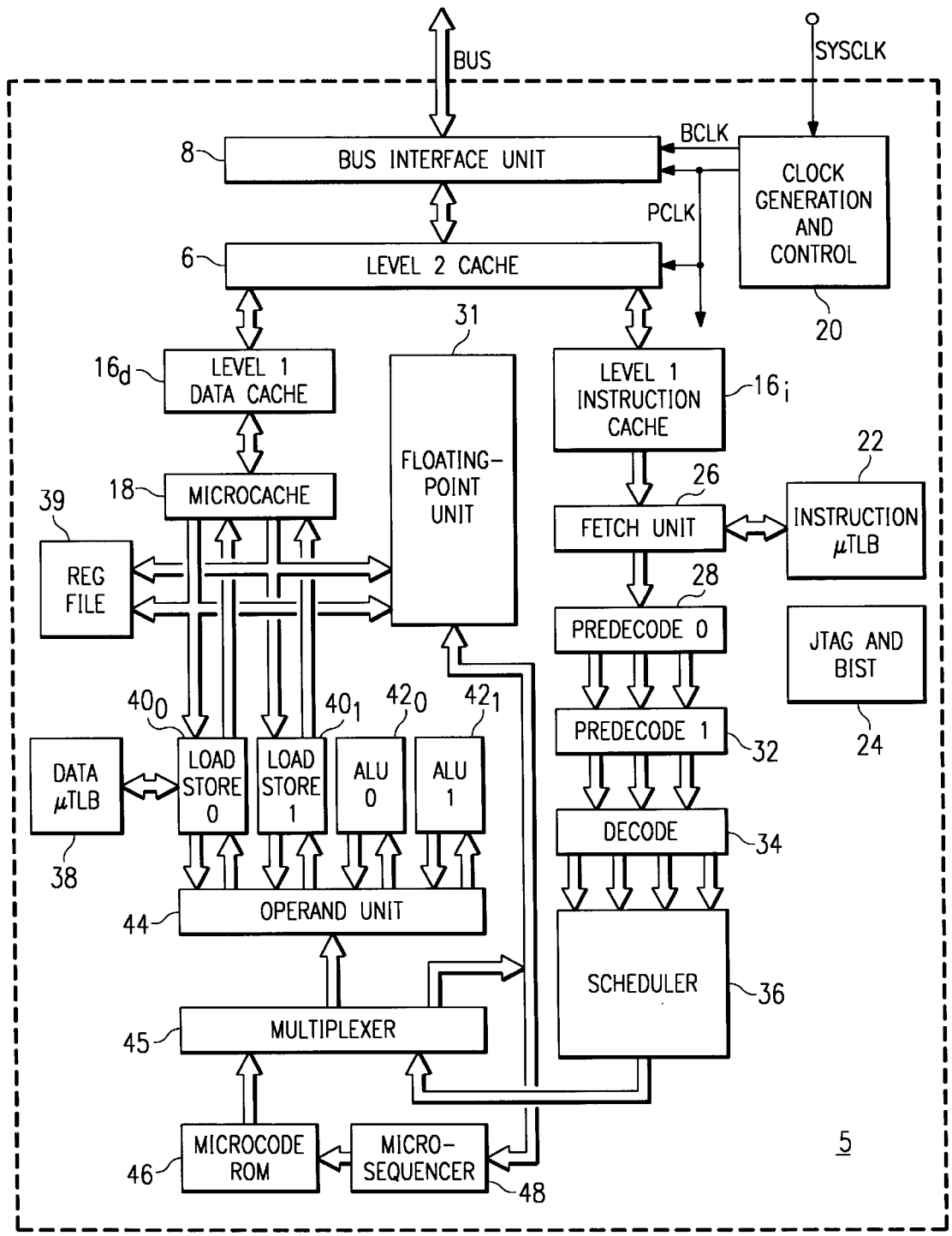
FIG. 1 is an electrical diagram, in block form, of a microprocessor constructed according to the preferred embodiment of the invention.

Referring now to FIG. 1, microprocessor 5 according to the preferred embodiment of the invention is illustrated in block diagram form, will now be described. Microprocessor 5 includes bus interface unit (BIU) 8 connected to external bus BUS, which controls and effects communication between microprocessor 5 and the other elements in a microprocessor-based system, such as memory, input/output functions, disk storage, and the like. BIU 8 includes the appropriate control and clock circuitry to perform this function, including write buffers for increasing the speed of operation, and including timing circuitry so as to synchronize the results of internal microprocessor operation with bus BUS timing constraints. Microprocessor 5 also includes clock generation and control circuitry 20 which, in this example, generates clock phases based upon system clock SYSCLK.

As is evident in FIG. 1, microprocessor 5 has three levels of internal cache memory, with the highest of these as level 2 cache 6, which is connected to BIU 8 by way of an internal bus. In this example, level 2 cache 6 is a unified cache, and is configured to receive all cacheable data and cacheable instructions from bus BUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 5 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer (μTLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

F Fetch: This stage generates the instruction address and reads the instruction from the instruction cache or memory PDO Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps) SC Schedule: This stage assigns up to four AOps to the appropriate execution units (including FPU 31) OP Operand: This stage retrieves the register operands indicated by the AOps EX Execute: This stage runs the execution units according to the AOps and the retrieved operands WB Write-back: This stage stores the results of the execution in registers or in memory The operation of this pipeline, referred to hereinbelow as the "integer pipeline", in combination with the floating-point pipeline of FPU 31 according to the preferred embodiment of the present invention will be described in further detail hereinbelow.

Referring back to FIG. 1, the pipeline stages noted above are performed by various functional blocks within microprocessor 5. Fetch unit 26 generates instruction addresses from the instruction pointer by way of instruction microtranslation lookaside buffer (μTLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

Figure 2:
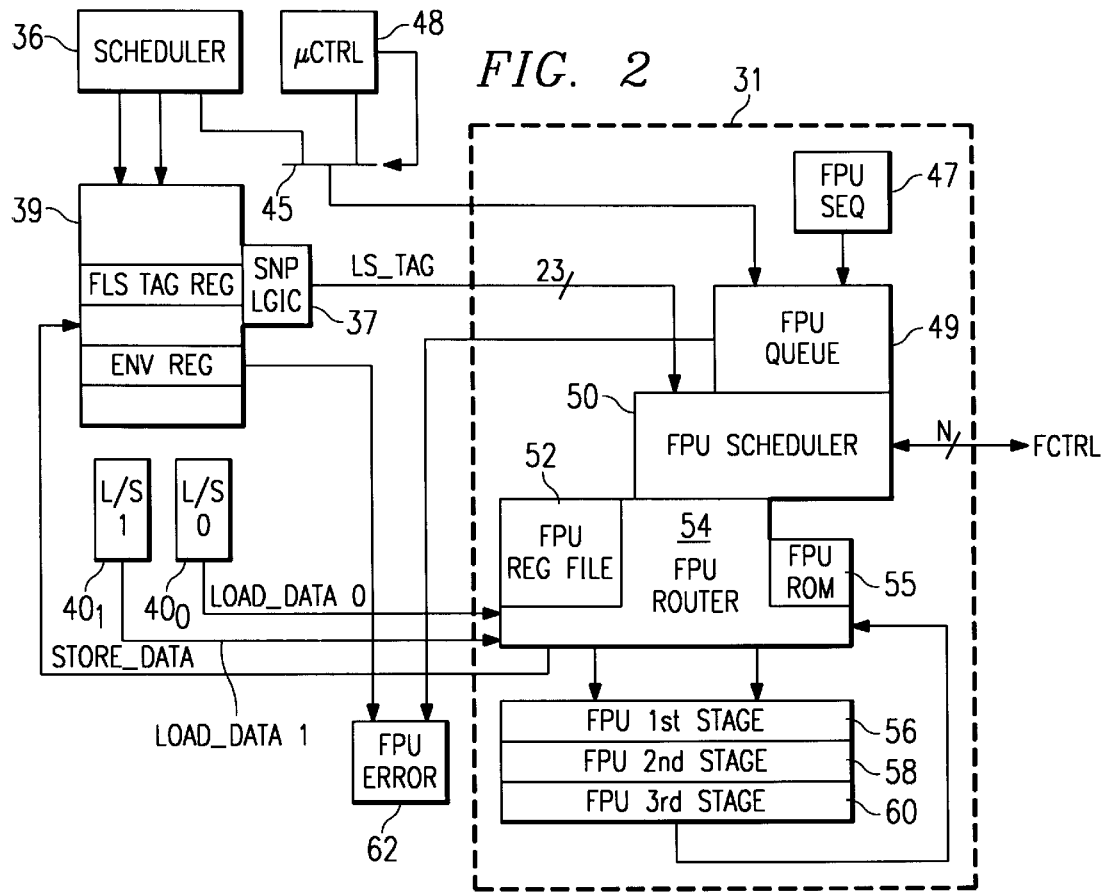
FIG. 2 is an electrical diagram, in block form, of a floating-point unit in the microprocessor of FIG. 1.

Referring now to FIG. 2, the construction of FPU 31, and its interconnection with the other functional blocks of microprocessor 5, will now be described in detail. Each of the functional blocks of FPU 31 will be described in individual detail hereinbelow. FPU 31 includes FPU queue stage 49, which is effectively an instruction buffer between the integer portions of microprocessor 5 and the execution stages of FPU 31. FPU queue stage 49 receives FPU instructions from scheduler 36 or from integer microsequencer 48 (in the case of microcoded instructions), via multiplexer 45 that is under the control of microsequencer 48. FPU queue stage 49 also receives FPU instructions from FPU sequencer 47, for the execution of microcoded FPU instructions.

FPU queue stage 49 is connected to FPU scheduler 50 which, in this example, performs the scheduling function for floating-point instructions separately from scheduler 36 in the integer portion of microprocessor 5. FPU scheduler 50 is logic that operates in similar fashion as scheduler 36, responsive to instructions forwarded thereto from FPU queue stage 47, and also responsive to address information conveyed thereto from register file 39. Register file 39 includes at least one register FLS TAG, which stores the format of data operands that are to be used by FPU 31. Snoop logic 37 is associated with register file 39 to monitor the pipeline for load/store operations corresponding to floating-point instructions, for example as may be stored in register FLS TAG. Snoop logic 37 encodes certain information corresponding to floating-point load/store directives, and forwards this information to FPU scheduler 50 on bus LS_TAG in a manner which will be described in further detail hereinbelow. In response to the floating-point AOps and to the load/store directives, FPU scheduler 50 issues control signals to the remaining functional blocks of FPU 31 to execute the instructions communicated thereto.

FPU 31 includes its own register file 52. Registers included within FPU register file 52 include a floating-point status word (FSW), a floating-point control word (FCW), and an eight-register data stack (consistent with the x86 instruction set). The five floating-point envirornent registers, useful for interrupt handling, are included in the integer register file 39 (shown in FIG. 2 as ENV), as these registers are not used internally by FPU 31.

FPU router stage 54 operates in conjunction with FPU scheduler 50 to forward the desired operands to the execution stages of FPU 31. FPU router stage 54 receives floating point operands from multiple sources, such sources including load/store units $40_0$, $40_1$ (presenting data on buses LOAD_DATA0, LOAD_DATA1, respectively), floating-point register file 52, constant data ROM 55, and FPU 3rd execution stage 60 (which presents writeback data from the results of prior instructions). Constant data ROM 55 stores common floating-point constants (e.g., $\pi$, e, $\sqrt{2}$) that may be used in floating-point instruction execution, particularly in transcendental function evaluation. FPU router stage 54 selects among the various operands for presentation to FPU 1st stage 56 for execution.

FPU 1st, 2nd, and 3rd execution stages 56, 58, 60, respectively, each include conventional arithmetic logic units used in floating-point arithmetic, and each include a status pipeline, a datapath, and a control pipeline. The control pipeline communicates control information regarding the instruction type, rounding mode, precision, exception masks and format control signals, along with the current instruction and operands in the corresponding execution stage. Similarly, the status pipeline uses both the control signals and also the data related information from the data path to generate an instruction status that also travels along with the instruction and operands along the FPU execution pipeline. The data path, including both an exponent pipeline and a mantissa pipeline given the floating-point operation of FPU 31, includes the necessary hardware for performing the arithmetic operations corresponding to the instruction. The output of FPU 3rd stage 60 is forwarded back to FPU router 54 for further handling. The datapaths of FPU 1st, 2nd, and 3rd execution stages 56, 68, 60 will be described in further detail hereinbelow.

Communication of control signals and data to and from FPU 31 is effected in several ways. As noted above, multiplexer 45 forwards floating-point instructions to FPU queue stage 49 from integer scheduler 36 and microcontroller 48, and FPU 31 receives certain information regarding the format of operands from register file 39 on bus LS_TAG. Operands retrieved from memory are also forwarded from load/store units 40 to FPU router 54, as noted above. The results of the floating-point instruction are presented by FPU router 54 to register file 39 on bus STORE_DATA, as shown in FIG. 2. Status information, including identification of exceptions and the like are stored in FPU error registers 62, as indicated by environment registers ENV in integer register file 39 and also by FPU queue stage 49. Other control signals, including signals to flush the FPU pipeline and to stall FPU operation, are communicated to and from FPU scheduler 50 by way of FPU control bus FCTRL.

As is evident from FIG. 2, FPU 31 includes its own scheduler 50, separate and distinct from scheduler 36 for the integer pipeline of microprocessor 5. According to this preferred embodiment of the invention, therefore, the scheduling of atomic floating-point operations (atomic in the RISC sense) is performed by FPU 31 itself, and does not require the involvement of scheduler 36. In effect, each floating-point instruction issued by scheduler 36 is, from the viewpoint of scheduler 36, an atomic operation in the same sense as atomic operations on the integer side. As a result of this architecture, the integer pipeline need not stall or wait for the completion of floating-point instruction execution (as in the case of conventional x86 architecture CISC processors), nor does scheduler 36 become bogged down in the scheduling of both atomic floating-point operations and integer atomic operations, as in the case of conventional RISC processors.

According to this preferred embodiment of the invention, the scheduling operations performed by scheduler 50, FPU queue stage 49, and router 54 in FPU 31 includes those operations required to launch floating-point instructions into their execution stages. In this regard, queue stage 49 decodes the atomic floating-point operations received from scheduler 36 into the appropriate control signals, and scheduler 50 applies these control signals to the execution stages in FPU 31, after determining whether the atomic floating-point operations are of the single-cycle, single-pass, or microcoded type, and after identifying and handling any dependencies or hazards caused thereby. Scheduler 50 is also responsible for obtaining and formatting the floating-point operands for launching along with the control signals.

Also according to this preferred embodiment of the invention, scheduler 50 in FPU 31 also handles instruction completion, including writeback and update of machine status. In the event of any exceptions resulting from the execution of a floating-point operation, such as NaN (not a number), overflow, underflow, and the like, scheduler 50 is also responsible for handling the exceptions and reporting the exceptions to the integer pipeline. Scheduler 50 and router 54 also provide an interface with the integer logic, as is necessitated by the distribution of the scheduling function to FPU 31.

Figure 3:
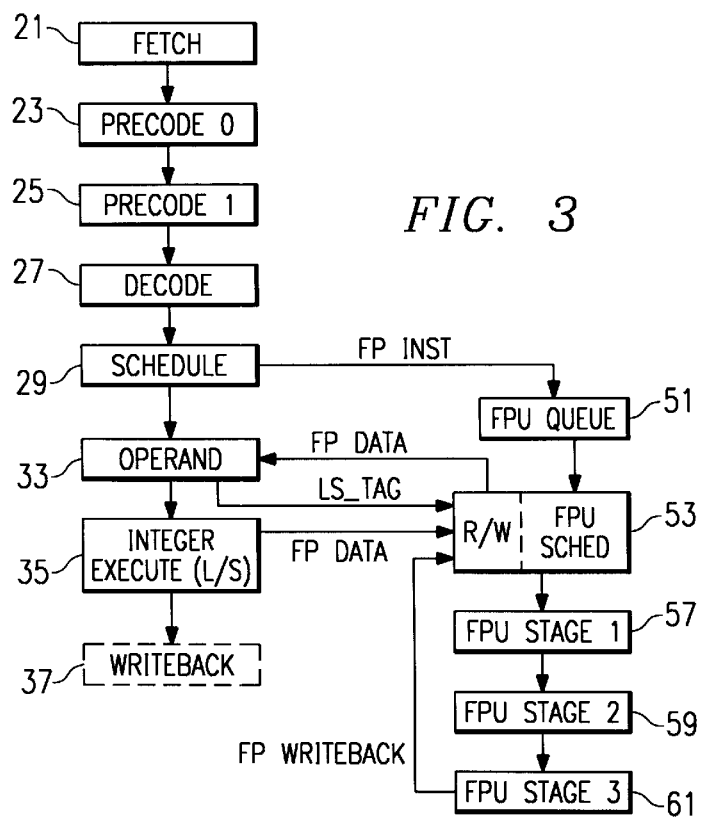
FIG. 3 is a flow chart illustrating the cooperation between the integer and floating-point pipelines in the microprocessor of FIG. 1.

Referring now to FIG. 3, the cooperative operation of the integer and floatingpoint pipelines in microprocessor 5 according to the preferred embodiment of the invention will now be described. As described in detail hereinabove, both integer and floating-point instructions follow a pipeline (or multiple pipelines, considering the superscalar nature of microprocessor 5) according to this embodiment of the invention) beginning with the instruction fetch stage 21, predecode 0 stage 23, predecode 1 stage 25, and instruction decode stage 27; these operations are performed by fetch unit 26, predecode 0 stage 28, predecode 1 stage 32, and decode unit 34, respectively, as described hereinabove. Schedule stage 29 in the pipeline, performed by scheduler 36 as described above, issues non-floating-point instructions as atomic operations (AOps) or as microcoded sequences, each of which pass through the operand (or register) pipeline stage and are executed (including access of load/store units 40) in stage 35. Writeback operations then are performed in pipeline stage 37.

In schedule stage 29, scheduler 36 forwards floating-point instructions to floating point queue pipeline stage 51, in the form of complete atomic instructions (FP INST in FIG. 3). After buffering by floating-point queue 49, these floating-point instructions are then scheduled by FPU scheduler 50 in FPU scheduling pipeline stage 53. Floating-point queue stage 51 is inserted prior to FPU scheduling stage 53 in the FPU pipeline because all memory accesses require two cycles (register access and load/store) in the x86 architecture. FPU queue stage 49 is thus used to perform opcode decoding and other instruction routing functions for a new floating-point instruction prior to its scheduling, given the necessity for the additional cycle for memory access.

Following floating-point queue pipeline stage 51, the floating-point instruction next enters the floating-point schedule pipeline stage 53. As shown in FIG. 3, floating-point schedule stage 53 also includes a read/write stage, which is performed by FPU router 54 simultaneously with the scheduling performed by FPU scheduler 50. In floating-point schedule pipeline stage 53, scheduler 50 checks the instruction for dependencies, fetches the register operand (illustrated by the parallel read/write stage), and prepares the instruction for execution. As in the case of integer scheduling described hereinabove, each floating-point instruction is scheduled as atomic operations, and may be single-cycle atomic instructions, single-pass multi-cycle instructions, or microcode instructions. Examples of single-cycle instructions include register exchange instructions (FXCH) and simple arithmetic instructions such as change sign (FCHS) and absolute value (FABS). Single-pass instructions include arithmetic operations such as multiply, add, subtract, and compare (FMUL, FADD, FSUB, FCOM, respectively). Microcode instructions are typically a sequence of single-pass and single-cycle instructions stored in ROM for performing complex operations such as square-root, transcendental function evaluation and the like.

Once scheduling stage 53 is complete, the floating-point instructions are executed in three successive execution stages 57, 59, 61. The results of FPU 3rd stage 61 are then returned to parallel read/write stage 53 for forwarding into the integer pipeline, as shown in FIG. 3.

Figure 4:
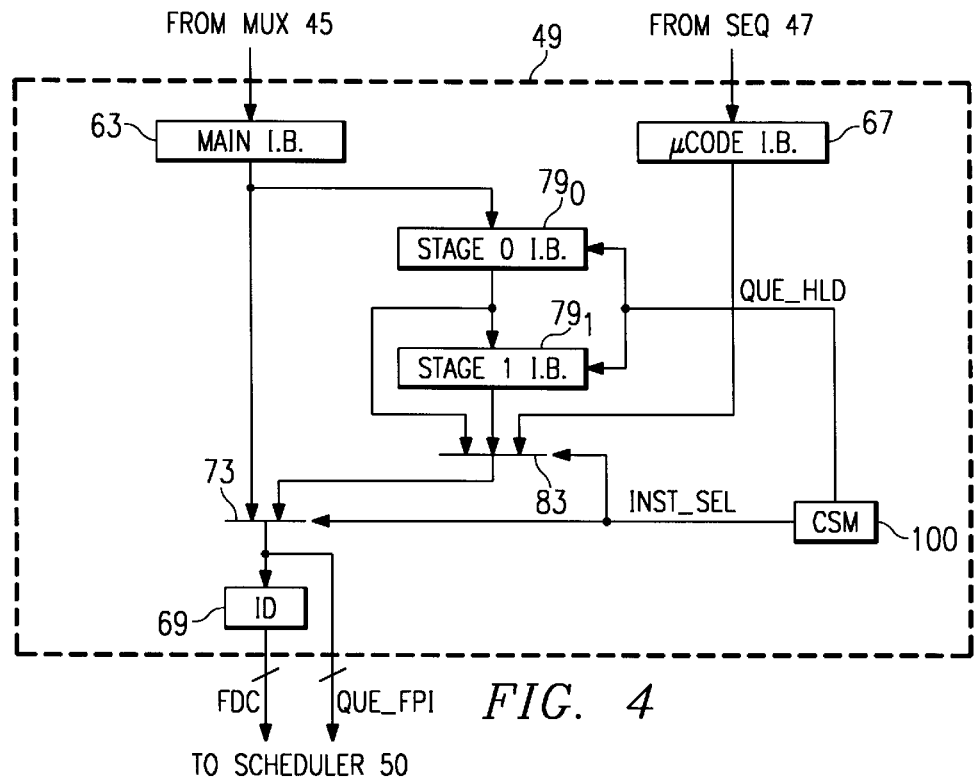
FIG. 4 is an electrical diagram, in block form, of the floating-point queue unit in the floating-point unit of FIG. 2 according to the preferred embodiment of the invention.

Attention is now directed to FIG. 4 relative to which the construction and operation of FPU queue stage 49 will now be described. As noted above, FPU queue stage 49 receives a floating-point instruction from multiplexer 45, and also is connected to receive a microcode instruction from FPU sequencer 47. As shown in FIG. 4, FPU queue stage 49 includes main instruction buffer 63 to receive and store the instruction from multiplexer 45, and code instruction buffer 67 to receive and store a microcode instruction from FPU sequencer 47. Main instruction buffer 63 presents its contents to instruction decode 69 via multiplexer 73, serving as the main instruction path through FPU queue stage 49. Main instruction buffer 63 also presents its contents to a two-stage FIFO consisting of stage 0 instruction buffer $79_0$ and stage 1 instruction buffer $79_1$; this FIFO of buffers 79 serves to store the instructions that are currently in the execution stages of FPU 31, so that the FPU pipeline may be restarted without being flushed in the event of an exception. Stage 0 instruction buffer $79_0$ and stage 1 instruction buffer $79_1$ are each connected to inputs of multiplexer 83, the output of which is presented to an input of multiplexer 73. Similarly, μcode instruction buffer 67 also presents its contents to an input of multiplexer 83.

FPU queue stage 49 is controlled by control state machine (CSM) 100, which receives control signals from instruction decode 69, and from elsewhere in FPU 31 and the integer portion of microprocessor 5. Control state machine 100, among other tasks, controls the operation of multiplexers 73, 83 via bus INST_SEL to select the appropriate input for presentation to instruction decode 69. Control state machine 100 also issues control signals on lines QUE_HLD, the assertion of which will cause buffers 79 to maintain their contents over a cycle boundary. Control state machine 100 also may receive a stall signal (not shown), responsive to which it can cause FPU queue stage 49 to stop progressing from cycle to cycle, and may receive a flush signal (not shown), responsive to which it can reset the contents of its buffers.

In operation, single-pass and single-cycle instructions are received from multiplexer 45 and stored in main instruction buffer 63. After decoding of the prior instruction, the contents of main instruction buffer 63 are forwarded to instruction decode 69, which decodes the floating-point instruction into execution control signals that are forwarded to scheduler 50 on lines FDC. The contents of main instruction buffer 63 pertaining to the source and destination register addresses, addresses in constant ROM 55, and execution control specifics (e.g., true__x86 indicators, rounding modes, precision ranges, and the like) are also forwarded to scheduler 50 on lines QUE__FPI in order to communicate the execution modes of the floating-point operation to the execution stages of FPU 31. The contents of main instruction buffer 63 are also loaded into stage 0 instruction buffer $79_0$ prior to the receipt of the next floating-point instruction, with the prior contents of stage 0 instruction buffer $79_0$ loaded into stage 1 instruction buffer $79_1$. As noted above, buffers 79 store the instruction opcodes of the instructions currently being executed by FPU 31, for use in the event of an exception such as denormal operands or underflow. In such an event, control state machine 100 can control multiplexers 73, 83 to select the appropriate one of buffers 79 in order to reissue that instruction for decoding and execution.

In the event that instruction decode 69 determines that the instruction being decoded is a floating-point microcoded instruction, scheduler 50 will cause FPU sequencer 47 to begin issuing the appropriate microcode instructions. FPU sequencer 47 is constructed according to conventional architecture for integer microcode sequencers, and as such includes a microcode ROM that is addressable by way of a register and multiplexer arrangement, including the appropriate control logic. Preferably, FPU sequencer 47 is a branch-always architecture, in which successive microinstruction addresses are determined from one of four branch options (current address for stalling, next sequential address for sequential microprogram flow, immediate branch, or stack address for subroutine calls). When enabled to respond to microinstructions by sequencer 50, FPU sequencer 47 will issue sequences of atomic operations (i.e., the output of its microcode ROM) to $\mu$code instruction buffer 67 in FPU queue stage 49; control state machine 100 will then cause multiplexers 73, 83 to select the contents of $\mu$code instruction buffer 67 for application to instruction decode 69 until such time as the microcode sequence is completed. When idle, FPU sequencers 47 will issue floating-point NOPs to FPU queue stage 49.

Figure 5:
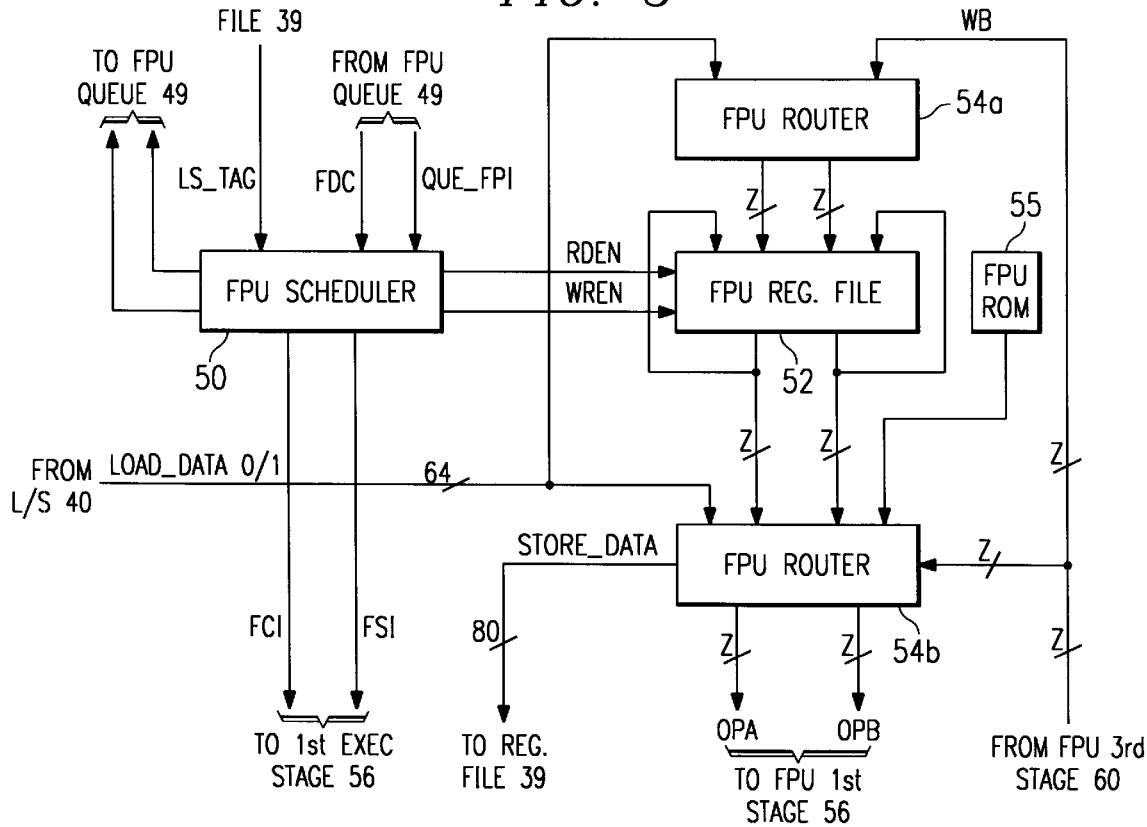
FIG. 5 is an electrical diagram, in block form, of a portion of the floating-point unit of FIG. 2 according to the preferred embodiment of the invention.

Referring now to FIG. 5, the interconnection of FPU scheduler 50, FPU register file (FPR) 52, FPU router 54, and FPU ROM 55 will now be described in detail, as performing the scheduling and read/write FPU pipeline stage 82. As shown in FIG. 5 and as referred to hereinabove, FPU scheduler 50 receives control signals from FPU queue stage 49 on lines FDC, and receives a portion of the instruction itself therefrom on lines QUE__FPI. According to the preferred embodiment of the invention, the function of scheduler 50 is to provide central execution control for each floating-point instruction to be executed by FPU 31. Maximum floating-point performance will be maintained by scheduling a new instruction in each cycle, such that the execution pipeline remains full. In order to approach this goal, resource dependencies and exception hazards are identified and handled by FPU scheduler 50.

FPU scheduler 50 also receives load/store directives on lines LS__TAG from snoop logic 37 of integer register file 39, according to this embodiment of the invention. Snoop logic 37 analyzes the many load/store atomic operations processed along the integer pipeline, identifies those that relate to floating-point operations, and encodes information regarding memory loads and stores for floating-point operands onto lines LS__TAG. The load/store directives on lines LS__TAG indicate the format of the floating-point operands that are to be communicated to FPU 31, and other information regarding a floating-point instruction. For example, lines LS__TAG will indicate whether the integer registers are the destination or source for a particular floating point instruction, whether the instruction is a single cycle instruction (push to top of stack, write to FPR 52, or store), the precision and type of the data (single or double precision, integer, floating-point, status or control word, etc.), and the portion of an extended precision floating point word to which the thirty-two bit operand corresponds. These parameters are used by FPU scheduler 50 to properly control the remainder of the circuitry in FPU 31, such as on lines RDEN (read enable) and WREN (write enable) sent to FPU register file 52, and on lines FC1, FS1 that are forwarded to FPU execution stages 56, 58, 60. The receipt and handling of these load/store directives according to the preferred embodiment of the invention will be discussed in further detail hereinbelow.

According to this preferred embodiment of the invention, FPU scheduler 50 receives instruction control signals and directives from three sources, namely directives from load/store units 40 on lines LS__TAG, decoded control signals and opcodes from FPU queue stage 49 on lines FDC and QUE__FPI, respectively, and address information from writeback bus WB generated by FPU 3rd execution stage 60 in response to a single-pass instruction previously launched and executed. Based upon these inputs, FPU scheduler 50 checks for dependencies, or pipeline conflicts, among the resources to which the instructions, control signals and directives point. The source and destination resources to which the floating-point AOps already in the pipeline are recorded and analyzed by FPU scheduler 50 relative to each new instruction or directives in performing this function. FPU scheduler 50 also updates and maintains the machine status, for example by way of a floating-point status word FSW and a floating-point control word FCW.

Based on this information, scheduling logic in FPU scheduler 50 determines which operations to actually launch for execution in the next cycle. In the event that no dependencies are detected and that the currently scheduled instruction includes a read or write to a register in the stack, FPU scheduler issues commands to floating-point register file 52 to validate previously issued enable signals according to the instruction being scheduled, and generates signals FPU router 54 to select the appropriate operands for forwarding to FPU 1st execution stage 56 according to the instruction being launched. Also depending upon the instruction, FPU scheduler 50 may initiate a floating-point microcoded instruction by issuing the responsible floating point instruction and a corresponding microcode entry address to queue stage 49, which will initiate the microcode routine from the entry address so that the next sequence of instructions will be generated from FPU sequencer 47 in microcode. Finally, single-pass instructions are initiated by FPU scheduler 50 by control signals on lines FC1, FS1 to FPU 1st execution stage 56.

In normal operation, where no conflicts or dependencies are detected, a new floating-point instruction will advance through FPU scheduler 50 on every cycle. In the event that a dependency is detected, FPU scheduler 50 will stall the pipeline. The instruction being scheduled at the time of a stall will not proceed, and will be held up until the dependency or exception clears. In the event of a conflict that causes the execution of an earlier instruction to not complete in normal fashion (e.g., prior to execution of an instruction upon a denormal operand, or execution resulting in not-a-number NaN), FPU scheduler 50 will issue an abort sequence, in which case the instructions currently in the floating-point pipeline will be flushed, and the floating-point sequence will be restarted.

FPU router 54 may be considered in two portions 54a, 54b, as shown in FIG. 5, with portion 54a routing the appropriate data to FPU register file 52, and with portion 54b routing the appropriate signals from FPU register file 52 and elsewhere to the execution stages as operands OPA, OPB and to register file 39 on lines STORE_DATA. Both of FPU router portions 54a, 54b are substantially an assembly of multiplexers that receive data from load/store units 40 on a sixty-four bit bus made up of lines LOAD_DATA0/1. FPU router portion 54a also receives an eighty-nine bit data word (referred to herein as the ZBUS described in detail hereinbelow, and labeled as such in FIG. 5) on lines WB from FPU 3rd execution stage 60. FPU router portion 54a thus presents the appropriate information from these two sources to FPU register file 52, also by way of an eighty-nine bit ZBUS.

Figure 6:
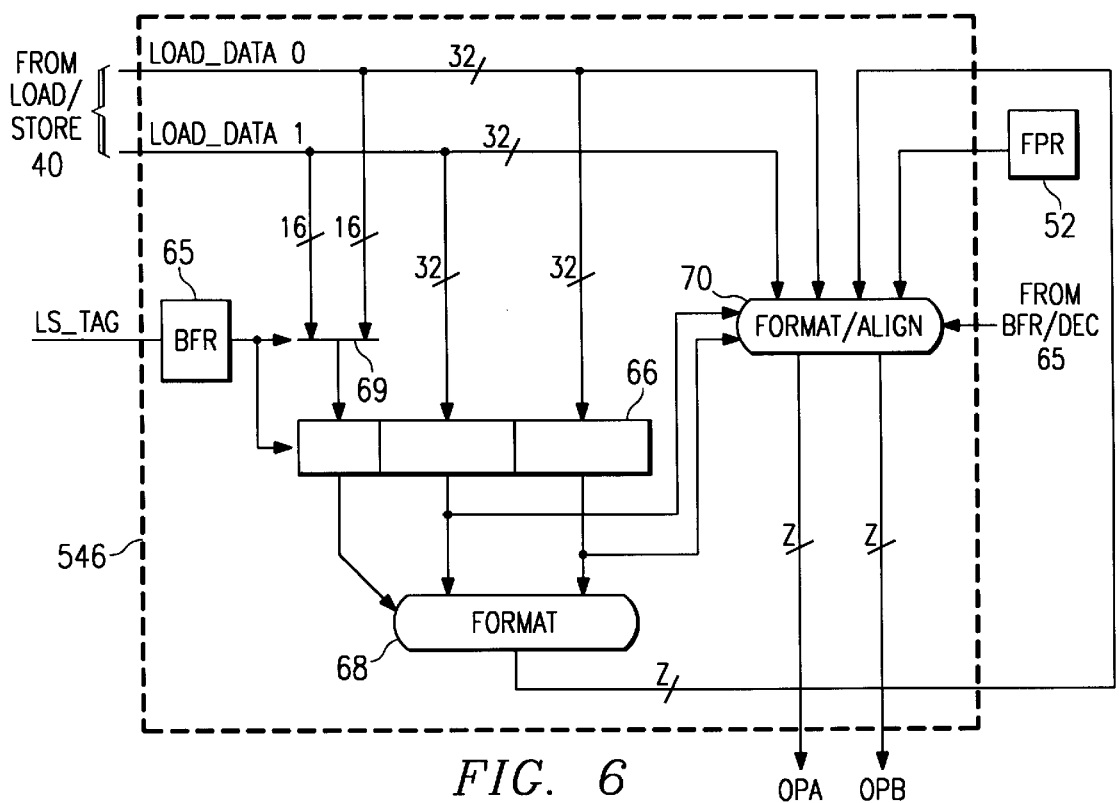
FIG. 6 is an electrical diagram, in block form, of the construction of a portion of the router in the floating-point unit of FIG. 2 according to the preferred embodiment of the invention.

Lower FPU router portion 54b receives operands from FPU register file 52 (on Z buses), operands retrieved from memory by load/store units 40 on lines LOAD_DATA0/1, constants from FPU ROM 55 when called, and results on writeback bus WB from FPU 3rd execution stage 60. FPU router portion 54b thus, under the control of FPU scheduler 50, presents the selected operands, in Z bus format, to FPU 1st execution stage 56 on operand buses OPA, OPB. As noted above, FPU register file 52 contains the eight-register data stack used by floating-point instructions in the conventional x86 instruction set. FPU ROM 55 includes certain constants useful in the evaluation of floating-point functions, as noted above. Referring now to FIG. 6, the construction of FPU router portion 54b will now be described in detail.

FIG. 6 illustrates the circuitry in FPU 31 for arranging floating-point operands, whether received from memory or from integer registers. According to this embodiment of the invention, FPU router portion 54b includes an 80-bit register 66 for receiving an operand from load/store units 40 (and thus retrieved from memory) on buses LOAD_DATA0 and LOAD_DATA1. As shown in FIG. 6, each of these buses is only 32 bits in data width, thus requiring multiple accesses to fully fill register 66 if desired. The directives on lines LS_TAG (stored in buffer/decoder 65 in router portion 54b) indicate, for each cycle, the intended location of the thirty-two bit data within the 80-bit register 66. This 80-bit register 66 corresponds, in this example, to the 80-bit extended format of the IEEE 754 floating-point standard.

According to this embodiment of the invention, as noted above, snoop logic 37 snoops each load/store instruction as it passes through operand stage 33 in the integer pipeline (see FIG. 3), and encodes certain floating-point format information pertaining to floating-point load/store operations onto bus LS_TAG for use by FPU 31. Bus LS_TAG, as will be apparent from the following table, communicates such information as whether the instruction is a load or store, identification of the register to which the load/store instruction is directed, and the precision and data type of the data word that is the subject of the load/store operation. Because load/store buses LOAD_DATA0 and LOAD_DATA1 are thirty-two bit buses in this example, if the type of data retrieved from memory is floating-point extended precision (i.e., 80-bit format under IEEE 754), bus LS_TAG also indicates the position of the thirty-two bits within the 80-bit format.

In this example, snoop logic 37 encodes the following control information regarding each floating-point load/store operation onto 23-bit bus LS_TAG:

| LS_TAG bits | Description |
| --- | --- |
| 3–0 | Destination or source register identifier<br>0xxx: architecture register<br>1xxx: temporary register |
| 4 | Push to top of stack (if set) |
| 5 | Write-to-FPR 52 request (if set) |
| 6 | Store operation (if set) |
| 7 | Data forwardable (if set) |
| 11–8 | Data type of operand<br>0000 = FP single precision<br>0001 = FP double precision<br>0010 = FP extended precision<br>01xx = signed integer (xx indicates word size)<br>10xx = unsigned integer (xx indicates word size)<br>1100: FSW (floating-point status word)<br>1101: FCW (floating-point control word)<br>1110: FTAG; 1111 = BCD80 |
| 12 | L/S0 and L/S1 swapped (if set) |
| 13 | Low 32 bits of 80-bit bus |
| 14 | Middle 32 bits of 80-bit bus |
| 15 | High 16 bits of 80-bit bus |
| 16 | For load operations: indicates that high 16 bits are in LOAD_DATA1<br>For store operations: indicates that the current tag is last in the store sequence |
| 17 | Tag is valid |
| 22–18 | x86 identification number of load/store |

For extended precision floating-point data words (bits 11-8 of bus LS_TAG being 0010), as shown in FIG. 6, the thirty-two bits on lines LOAD_DATA0 are stored in the least significant thirty-two bits of register 66, the thirty-two bits on lines LOAD_$_{DATA}$1 are stored in the next more significant thirty-two bits of register 66, and sixteen bits from either of buses LOAD_DATA0 OR LOAD_DATA1 (as indicated by LS_TAG), via multiplexer 69, fill the sixteen remaining MsBs of register 66. Formatter 68 is conversion logic that formats the output of register 66 into the desired floating-point or signed integer format (also as indicated by the directive on bus LS_TAG), recognizes special operand types (infinity, NaN, denormals), and forwards the formatted value in ZBUS format to floating-point register file 52 and to formatter/aligner 70, which is essentially an eight-to-one multiplexer. The lower sixty-four bits of register 66 are also forwarded directly to formatter/aligner 70, as is an output of floating-point register file 52. Formatter/aligner 70 selects the appropriate input, formats it as desired, and generates the operands OPA, OPB, both in ZBUS format, for application to FPU 1st execution stage 56.

According to the preferred embodiment of the invention, formatter/aligner 70 is also able to receive single precision or double precision floating point data words from buses LOAD_DATA0 and LOAD_DATA1 and align this data into operand OPB in the same cycle, thus avoiding the additional cycle or cycles required for reformatting data and registering the results prior to forwarding the operand to the execution stages that are used by conventional microprocessors for such operands. Specifically, if bits 11-8 on bus LS_TAG indicate that the memory data on buses LOAD_DATA0 and LOAD_DATA1 correspond to single or double precision operands, and if bit 7 indicates that the operand is forwardable, the contents of buses LOAD_DATA0 and LOAD_DATA1 are presented directly to formatter/aligner 70, which in turn formats these signals into operand OPB for forwarding to FPU 1st execution stage 56 in the same cycle. The forwardability of the operand is preferably encoded into bit 7 of bus LS_TAG so that FPU 31 need not include logic to itself determine if the operand is single-precision or double precision and thus immediately formattable; in addition, if certain single-precision or double-precision operands are not, for some reason, intended to be immediately formatted into the internal format, bit 7 of LS_TAG may be set accordingly. Formatter/aligner 70 generates a floating point operand in the expanded internal format from the data received in the single-precision and double-precision floating-point modes, without requiring the data to be buffered in register 66 and formatted by formatter 68, such operations requiring at least one additional machine cycle.

By way of reference, the internal ZBUS format of information in FPU 31 according to the preferred embodiment of the invention will now be described. As indicated in FIGS. 5 and 6 and the other Figures to be introduced below, each ZBUS bus is indicated by a Z indicator. The ZBUS format in this exemplary microprocessor is an 89-bit bus that represents the operand as (in order from MSB to LSB) one sign bit, a sixteen-bit exponent, and a seventy-two bit mantissa. This format, which is larger than the 80-bit IEEE format, includes additional precision in the mantissa to store intermediate results during divides, square-root, and transcendental functions that are executed as multiple passes through FPU 31. The ZBUS format is thus used for forwarding of operands OPA, OPB to FPU 1st execution stage 56, for communication of data from FPU router portion 54a to floating-point register file 52 and to FPU router portion 54b, and for communication of results on the writeback bus WB from FPU 3rd execution stage 60, as shown in FIG. 6.

Figure 7:
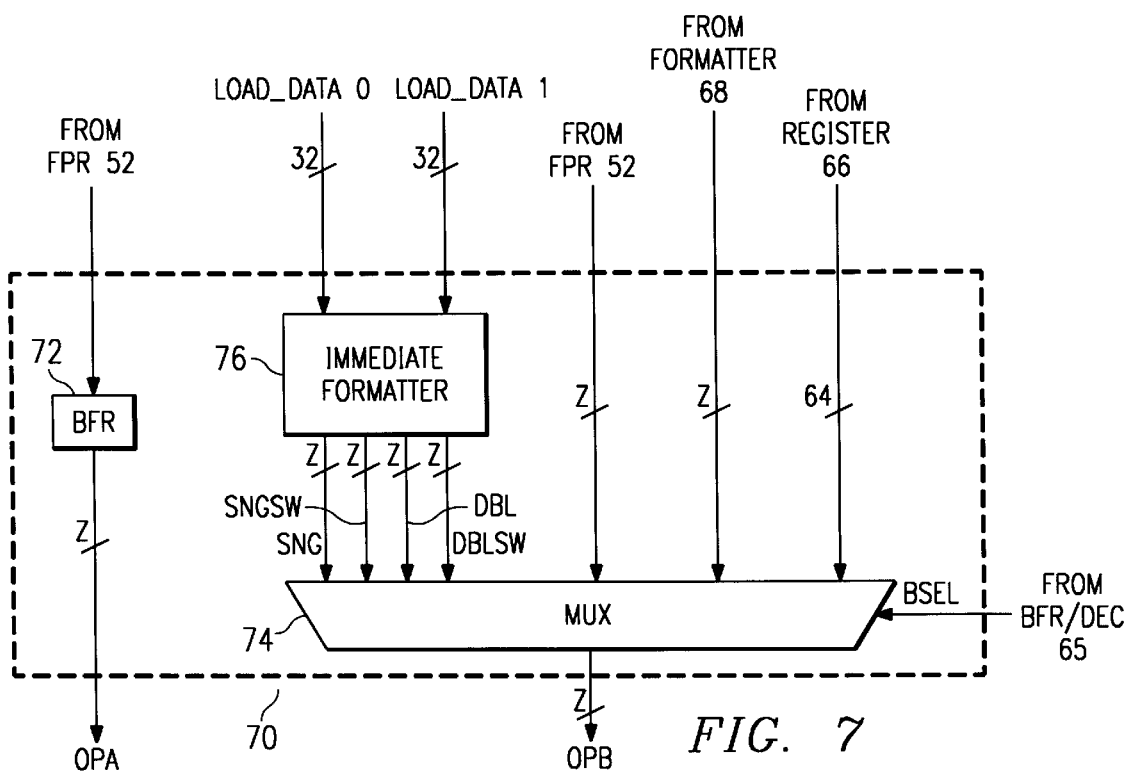
FIG. 7 is an electrical diagram, in block form, of the formatter/aligner in the floating-point unit of FIG. 2 according to the preferred embodiment of the invention.

Referring now to FIG. 7, the construction of formatter/aligner 70, including circuitry for performing the format conversion of floating-point single precision and double precision data words retrieved from memory and presented on buses LOAD_DATA0, LOAD_DATA1 into the internal extended ZBUS format according to the preferred embodiment of the invention, will now be described in detail.

Formatter/aligner 70 in this embodiment of the invention, and as shown in FIG. 6, forwards operands OPA, OPB to FPU 1st execution stage 56, under the control of FPU scheduler 50. In this embodiment of the invention, operand OPA may only be retrieved from floating-point register file 52, and as such formatter/aligner 70 receives the contents of a selected register in floating-point register file 52 in ZBUS format, temporarily stores these contents in buffer 72, and forwards the operand as operand OPA at the proper time.

Formatter/aligner 70 also includes multiplexer 74, which receives data corresponding to several possible operands to be applied to FPU 1st execution stage 56 as operand OPB. As in the case of operand OPA, the contents of one of the registers in floating-point register file 52 may be applied as operand OPB, and as such multiplexer 74 is coupled to floating-point register file 52 to receive an operand therefrom. Multiplexer 74 also has input coupled to formatter 68 and to register 66 to receive data words therefrom, for application to FPU 1st execution stage 56 as operand OPB in the case of non-forwardable operands, including those in precision modes other than single precision and double precision floating-point, and those operands indicated as non-forwardable by bit 7 of bus LS_TAG.

Formatter/aligner 70 according to this preferred embodiment of the invention, as noted above, also is capable of formatting single precision and double precision data words retrieved from memory for immediate application (i.e., within the same machine cycle) as operand OPB. According to this embodiment of the invention, formatter/aligner 70 thus includes immediate formatter 76, which has inputs coupled to buses LOAD_DATA0, LOAD_DATA1 to receive thereupon the output of load/store units $40_0$, $40_1$, respectively. As will be described in detail hereinbelow, immediate formatter 76 receives the data words on buses LOAD_DATA0, LOAD_DATA1, and formats the thirty-two bit data words received thereupon into four sets of ZBUS format output lines SNG, SNGSW, DBL, DBLSW corresponding to four possible cases of immediate formatting as follows:

| Output line set | Corresponds to retrieved memory operand: |
| --- | --- |
| SNG | Single precision operand on bus LOAD_DATA0 |
| SNGSW | Single precision operand on bus LOAD_DATA1 |
| DBL | Double-precision operand with mantissa LSBs on bus LOAD_DATA0 and mantissa MSBs, exponent, and sign bit on bus LOAD_DATA1 |
| DBLSW | Double-precision operand with mantissa LSBs on bus LOAD_DATA1 and mantissa MSBs, exponent, and sign bit on bus LOAD_DATA0 |

The four sets of ZBUS outputs SNG, SNGSW, DBL, DBLSW are presented to corresponding inputs of multiplexer 74. Multiplexer 74, in turn, selects the appropriate source of operand OPB from its sets of inputs, responsive to control signals BSEL produced by buffer/decoder 65 responsive to the information on bus LS_TAG described hereinabove.

As noted above, the ZBUS format according to the preferred embodiment of the invention represents floating-point data words using 89 bits. The left-most bit in the ZBUS format corresponds to the sign bit of the mantissa, as is conventional in many floating-point formats. The next sixteen left-most bits in the ZBUS data word are used to represent the exponent of the floating-point data word, with a bias of $7FFF_h$; accordingly, the ZBUS format can represent numbers having an exponent ranging from −32767 to +32768. As noted above, the ZBUS data word is used internally to FPU 31, with its extended precision useful in representing intermediate results; in this example, exponent values below $4000_h$ will indicate an underflow condition, while exponent values above $BFFF_h$ will indicate an overflow condition. The remaining sixty-four bits in the 89-bit ZBUS data word are used to represent the mantissa.

Figure 8:
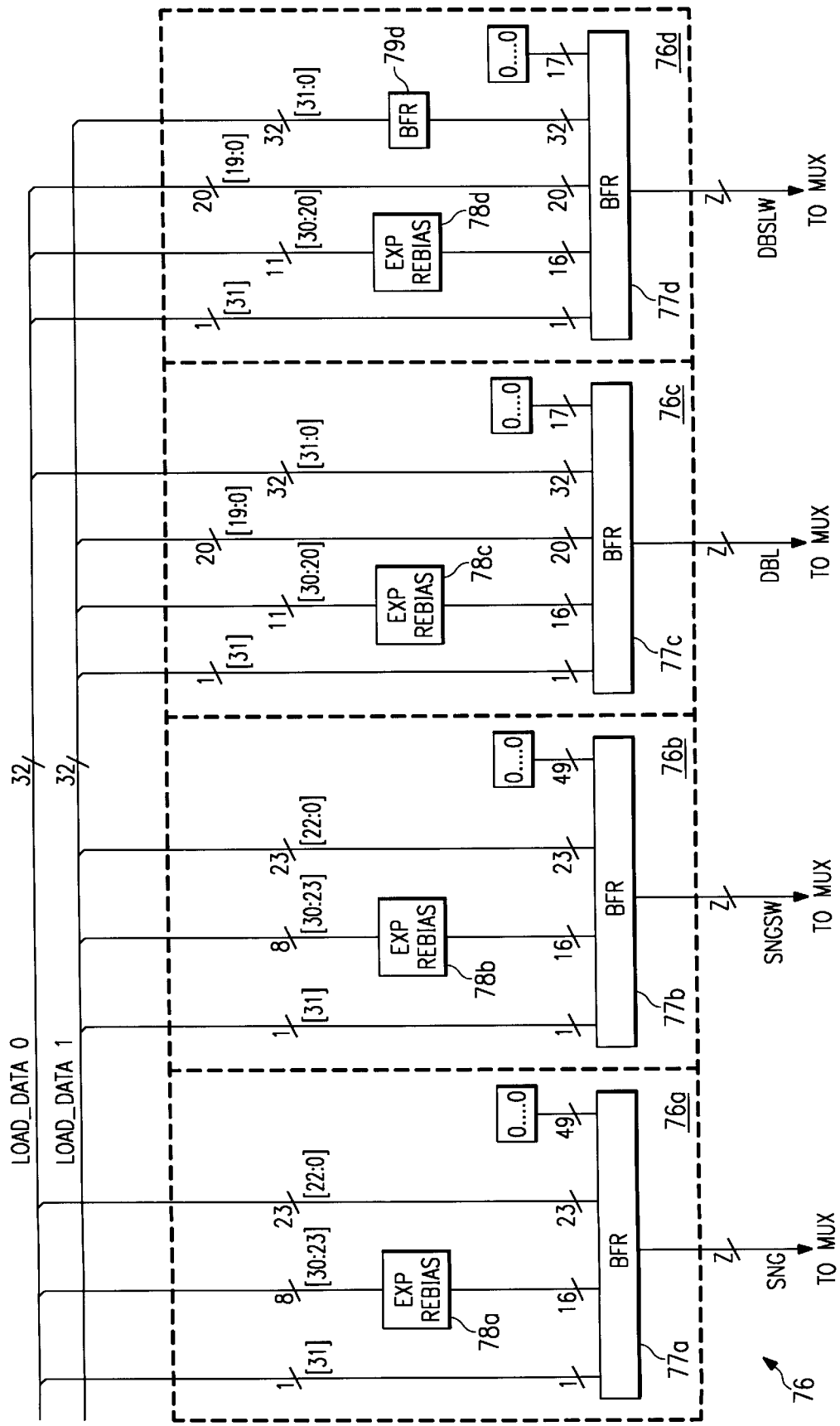
FIG. 8 is an electrical diagram, in block form, of the immediate formatter in the formatter/aligner of FIG. 7 according to the preferred embodiment of the invention.

Referring now to FIG. 8, the construction of immediate formatter 76 according to the preferred embodiment of the invention will now be described in detail. Immediate formatter 76 is constructed, in this example, so as to reformat the data words presented on buses LOAD_DATA0, LOAD_DATA1, which may be in one of four possible precision and order combinations, into the ZBUS format for presentation to multiplexer 74 for each memory access; multiplexer 74 will select the correct data according to the indication on bus LS_TAG. As such, and as shown in FIG. 8, immediate formatter 76 includes four reformatting paths 76a through 76d in parallel, as will now be discussed relative to FIGS. 8, and 9a through 9d.

Path 76a in immediate formatter 76 formats a single precision floating-point data word received on bus LOAD_DATA0 into the 89-bit ZBUS format. As is well known, single precision floating-point data words are represented (according to the IEEE 754 floating-point standard) by a sign bit, eight bits of exponent (with a bias of $7F_h$, or $127_{10}$), and twenty-three bits of mantissa. Accordingly, in path 76a of immediate formatter 76, left-most bit position [31] of bus LOAD_DATA0 (corresponding to the sign bit) is forwarded directly to the most significant bit position [88] of buffer 77a.

The eight exponent bit positions [30:23] of bus LOAD_DATA0 are forwarded to exponent rebias circuit 78a in path 76a of immediate formatter 76. Exponent rebias circuit 78a changes the bias value of the eight-bit exponent on bit positions [30:23] of bus LOAD_DATA0 from $7F_h$ to $7FFF_h$, simply by adding the difference of the biases (i.e., $7F80_h$) to the eight-bit exponent value of bit positions [30:23] of bus LOAD_DATA0; this addition may be implemented in exponent rebias circuit 78a by simple combinatorial logic. The sixteen bit output of exponent rebias circuit 78a is loaded into bit positions [87:72] of buffer 77a.

The twenty-three mantissa bit positions [22:0] of bus LOAD_DATA0 are forwarded directly to the twenty-three most significant mantissa bit positions of buffer 77a, namely bit positions [71:49]. The additional bits of mantissa precision provided in the ZBUS format relative to single precision, namely bit positions [48:0], are merely set to zero as shown in FIG. 8.

Figure 9A:
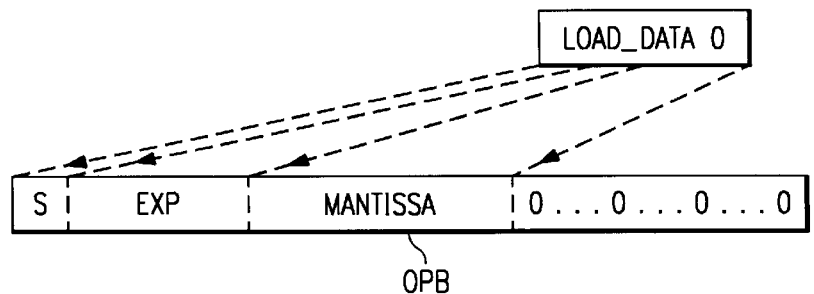
FIGS. 9a through 9d are timing and representational diagrams of the immediate formatting performed by the immediate formatter of FIG. 8.

FIG. 9a illustrates the reformatting of a single precision data word received upon bus LOAD_DATA0. As shown therein, the left most bit of bus LOAD_DATA0 becomes the sign bit of operand OPB, the next most significant portion of bus LOAD_DATA0 is expanded to become the exponent of operand OPB, the lower order bits of bus LOAD_DATA0 become the higher order portion of the mantissa of operand OPB, and the lowest order portion of operand OPB is set to zero.

Figure 9B:
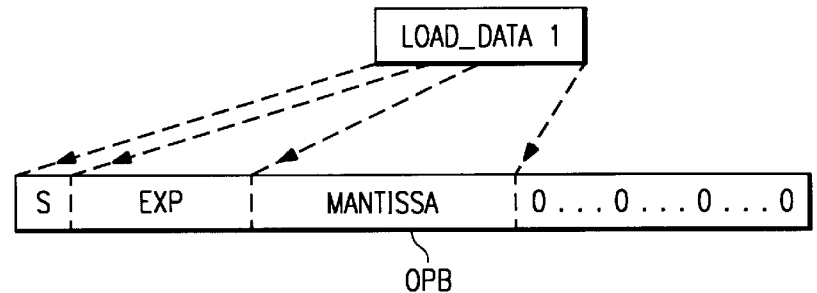

Referring now to FIG. 8 in combination with FIG. 9b, the construction and operation of path 76b of immediate formatter 76 will now be described. Path 76b is constructed identically as path 76a, but is connected to bus LOAD_DATA1 rather than bus LOAD_DATA0. The output of path 76b will be selected by multiplexer 74 for single precision memory loads presented by load/store unit $40_1$, indicated by the setting of bit 12 of bus LS_TAG. As such, bit position [31] of bus LOAD_DATA1 containing the mantissa sign bit is forwarded to the left-most bit position [88] of buffer 77b to again serve as the sign bit of the data word in ZBUS format. The eight-bit exponent portion of the data word on bus LOAD_DATA1 in bit positions [30:23] is received by exponent rebias circuit 78b which adds the bias differential value $7F80_h$ thereto, generating a sixteen-bit exponent that is stored in bit positions [87:72] of buffer 77b. The twentythree bit single precision mantissa on bus LOAD_DATA1 is forwarded directly to the twenty-three highest order mantissa bits [71:49] of buffer 77b, while the trailing mantissa bits [48:0] of buffer 77b are set to zero. As illustrated in FIG. 9b, the value placed onto bus LOAD_DATA1 in a cycle n is thus readily reformatted by immediate formatter 76 into operand OPB in this fashion.

Figure 9C:
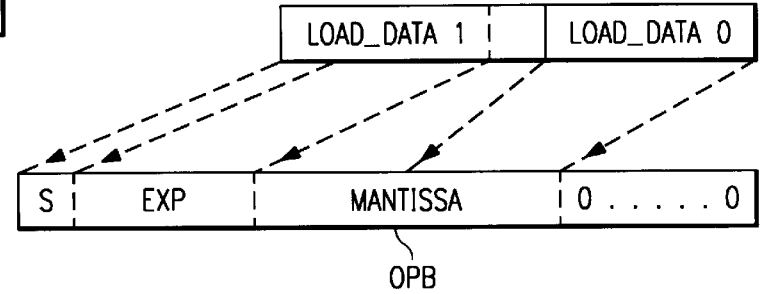

Referring now to FIG. 8 in combination with FIG. 9c, path 76c of immediate formatter 76 is for formatting a double precision floating point word received in cycle n on the combination of buses LOAD_DATA0, LOAD_DATA1. As is known in the art for x86-architecture microprocessors, the retrieval of a double precision floating-point data word from memory involves both load/store units 40, such that a portion of the data word is presented on bus LOAD_DATA0 and another portion is presented on bus LOAD_DATA1. If the entire double precision floating-point data word is retrieved in the same machine cycle n (see FIG. 9c), bus LOAD_DATA0 will carry the lower-order portion of the data word, and bus LOAD_DATA1 will carry the higher-order portion of the mantissa, the exponent (which, in the double precision case, is eleven bits and has a bias of $3FF_h$), and the sign bit.

Referring to FIG. 8, path 76c in immediate formatter 76 is constructed similarly as paths 76a, 76b, by including exponent rebias circuit 78c and buffer 77c, but with its inputs connected to the appropriate bit positions of buses LOAD_DATA0, LOAD_DATA1. In this embodiment of the invention, the most significant bit position [31] of bus LOAD_DATA1, which contains the mantissa sign bit, is forwarded to the left-most bit position [88] of buffer 77c to serve as the mantissa sign bit in the ZBUS format data word. The eleven exponent bit positions [30:20] of bus LOAD_DATA1 are forwarded to exponent rebias circuit 78c. In this case, the bias difference between $7FFF_h$ (ZBUS bias) and $3FF_h$ (double precision exponent bias) is $7C00_h$, which is added to the exponent value from bus LOAD_DATA1 by exponent rebias circuit 78c, preferably by combinatorial logic. As in the previous cases, the expanded sixteen bit exponent output from exponent rebias circuit 78c is applied to the sixteen exponent bit positions [87:72] of buffer 77c. The remaining twenty bit positions [19:0] of bus LOAD_DATA1 and the full thirty-two bit positions of bus LOAD_DATA0 (which are received in the same machine cycle and are thus simultaneously presented with the data on bus LOAD_DATA1 as shown in FIG. 9c) are stored into mantissa bit positions [71:20] of buffer 77c; the least significant twenty bit positions [19:0] of buffer 77c are set to zero, as shown in FIG. 8. In this manner, path 76c of immediate formatter 76 reformats a double precision floating-point data word present on buses LOAD_DATA1, LOAD_DATA0, in the same machine cycle, without requiring reformatting and storing in a temporary or other register in floating-point register file 52.

As is known in the art for x86-architecture microprocessors, efficient use of both load/store units 40 to perform memory accesses is often accomplished by splitting the access cycles. For example, if a memory access can be either accomplished or completed by using only load/store unit $40_0$ and bus LOAD_DATA0, memory access efficiency is improved by using the otherwise idle load/store unit $40_1$ to begin the next memory access. If this occurs in the retrieval of a double precision floating-point data word, bus LOAD_DATA1 would receive the lower-order portion of the mantissa of the double precision floating-point data word in one cycle, while bus LOAD_DATA0 would receive the higher order portion of the mantissa along with the exponent and the sign bit in the next cycle.

Figure 9D:
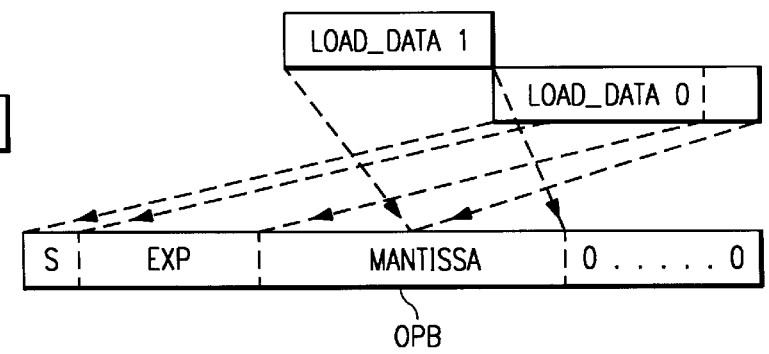

Referring now to FIG. 9d, such a situation is illustrated. In cycle n, bus LOAD_DATA1 receives the lower order portion of the mantissa (during this cycle, bus LOAD_DATA0 is either idle or busy with another transaction). In the next cycle n+1, bus LOAD_DATA0 receives the upper order portion of the mantissa along with the exponent and sign bit for the same double precision data word for which the lower order portion of the mantissa was on bus LOAD_DATA1 in the previous cycle n. Path 76d of immediate formatter 76 is provided to properly route the data to operand OPB as shown in FIG. 9d, as will now be described.

Path 76d includes an additional buffer 79d that stores the state of bus LOAD_DATA1 received in each cycle, for one additional machine cycle. The bit positions stored in buffer 79d are, of course, the thirty-two lower-order bits in the double precision data word retrieved from memory in cycle n. The output of buffer 79d is then presented to mantissa bits [51:20] of buffer 77d in the next machine cycle (cycle n+1 in the example of FIG. 9d), along with the data bits received on bus LOAD_DATA0 that are received in that next cycle.

In the next cycle n+1, path 76d directly forwards the sign bit in the left-most bit position [31] from bus LOAD_DATA0 to left-most bit position [88] in buffer 77d, to serve as the mantissa sign bit in the 89-bit ZBUS format data word. Path 76d also includes exponent rebias circuit 78d which adds bias difference value $7C00_h$ to the eleven-bit exponent value of bit positions [30:20] of bus LOAD_DATA0, and applies the sixteen bit result to bit positions [87:72] of buffer 77d, to serve as the exponent for the data word in ZBUS format. The remaining twenty bit positions [19:0] of bus LOAD_DATA0 are forwarded to mantissa bit positions [71:52] of buffer 77d, also in cycle n+1.

As a result of this construction, therefore, path 76d is able to immediately format a double precision floating-point data word that is received on load buses LOAD_DATA0, LOAD_DATA1, even in the case where the memory access is presented thereupon in a split cycle fashion.

Referring back to FIG. 7, multiplexer 74 thus receives the four sets of outputs from immediate formatter 76 on lines SNG, SNGSW, DBL, DBLSW, in each cycle, as well as possible operand values from floating-point register file 52, formatter 68 and register 66 as described hereinabove. In the case where a single precision or double precision floating-point data word has been retrieved from memory, multiplexer 74 will select one of the output sets of immediate formatter 76 for presentation as operand OPB to FPU 1st execution stage 56, responsive to the control signals on lines BSEL from buffer/decoder 65; one of the other possible operands may instead be selected by multiplexer 74 for a floating-point not involving a load from memory of a single or double precision floating-point data word. As described above, bus LS_TAG communicates information from the operand stage of the integer pipeline for each floating-point instruction including, for loads from memory, such information as the precision mode of the data word. In addition, as noted above, bit 12 of bus LS_TAG indicates whether the position of the data in the floating-point data word being loaded has been swapped between buses LOAD_DATA0, LOAD_DATA1; if this bit is set (indicating swapping), multiplexer 74 will select lines SNGSW from immediate formatter 76 for a single precision load from memory and lines DBLSW from immediate formatter 76 for a double precision load from memory. The selected inputs to multiplexer 74 will then be immediately (i.e., in the same machine cycle) presented to FPU 1st execution stage 56 as operand OPB, along with the appropriate operand value presented from floating-point register file 52 as operand OPA, by formatter/aligner 70.

According to the preferred embodiment of the invention, therefore, immediate formatter 76 is able to immediately format floating-point data words retrieved from memory (either cache or main memory) into the desired internal high-precision format (e.g., ZBUS format) used by the execution stages 56, 58, 60 of floating-point unit 31, without requiring temporary storage of the loaded data word into the floating-point register file 52 and the additional machine cycles required for such storage. In this example, this immediate formatting is performed for single precision and double precision data words loaded from memory. As it has been observed that the majority of memory load operations in conventional computer programs utilize floating-point data words in these precision modes, it is contemplated that significant performance improvement may be obtained through use of this example of the invention, even though other precision modes are not immediately formatted. It is of course further contemplated that one of ordinary skill in the art having reference to this specification may now similarly derive immediate formatting circuitry to perform immediate conversion of these other precision modes, if desired, without departing from the spirit of the present invention.

Figure 10:
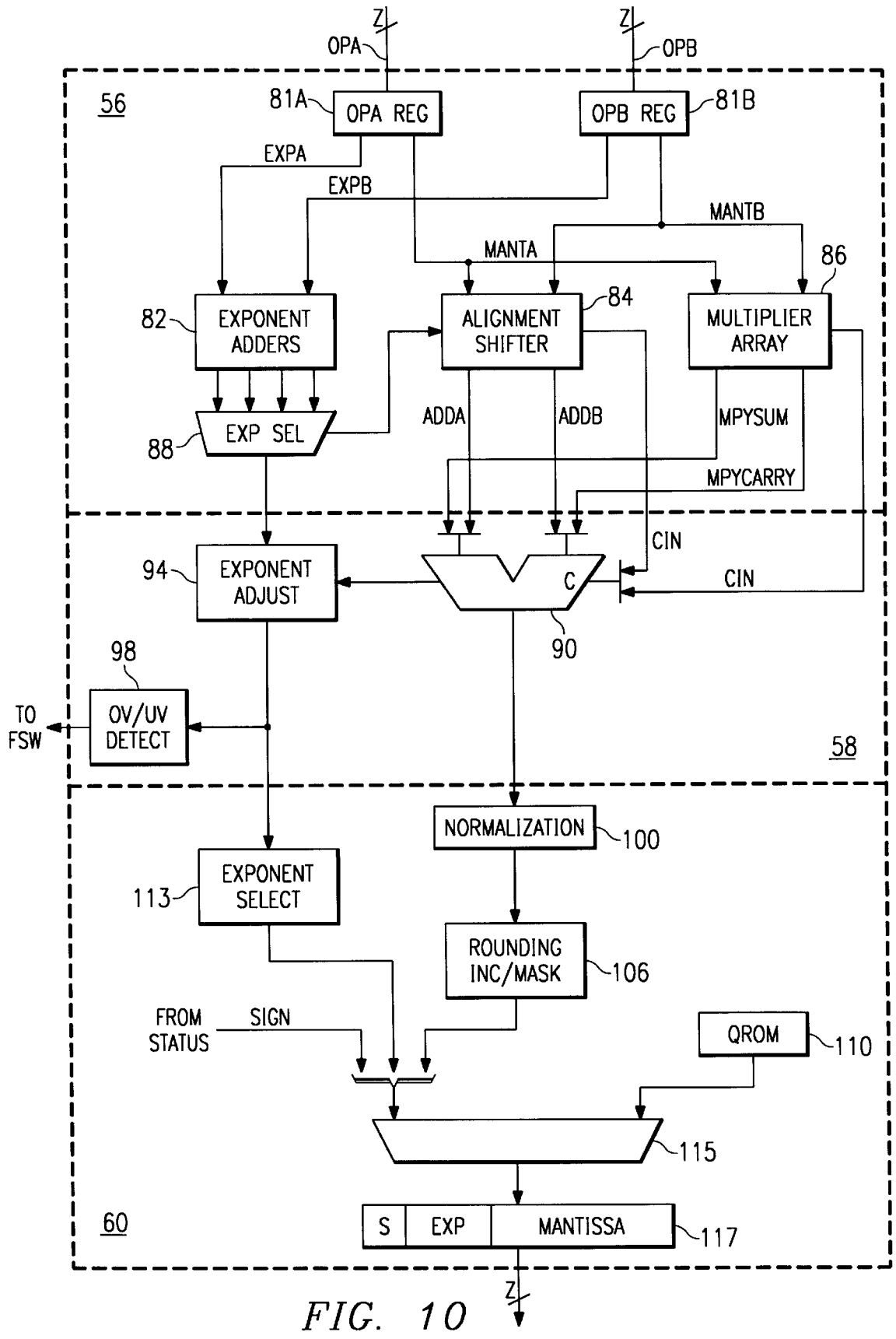
FIG. 10 is an electrical diagram, in block form, of the execution stages in the floating-point unit of FIG. 2 according to the preferred embodiment of the invention.

Referring now to FIG. 10, the datapaths of FPU 1st, 2nd, and 3rd execution stages 56, 58, 60 will now be described. As noted above, each of execution stages 56, 58, 60 also include control and status pipelines, along which control signals and status information travel in conjunction with the operands in the corresponding datapath. Only the datapaths will be described for execution stages 56, 58, 60 herein, for the sake of clarity, as it is contemplated that the corresponding control and status pipelines will be readily apparent to one of ordinary skill in the art having reference to this description.

FIG. 10 illustrates the construction of the datapath portion of FPU 1st execution stage 56 according to this preferred embodiment of the invention. Operands OPA and OPB are received from router portion 54b and stored in registers 81A, 81B, respectively. In this embodiment of the invention, FPU 1st execution stage 56 includes three datapaths; one datapath handles the exponents of floating-point operands OPA and OPB, a second datapath aligns the mantissas of operands OPA and OPB for add and subtract instructions, and a third datapath multiplies operands OPA and OPB for multiply and divide instructions. As such, exponent adders 82 in FPU 1st execution stage 56 receive exponent portions EXPA, EXPB of operands OPA, OPB, respectively, and generate the four results EXPA+EXPB−bias, used in multiplication; EXPA−EXPB+bias, used in division; and the results EXPB−EXPA and EXPA−EXPB used in floating-point adds and subtracts. Exponent selector 88 selects from among the four exponent adder results, under the control of a control signal from FPU scheduler 50, as generated for the current instruction. The output of exponent selector 88 produces an exponent value that is forwarded to FPU 2nd execution stage 58; these, and the others of, outputs from FPU 1st execution stage 56 are typically registered outputs for purposes of stability (the registers not shown in FIG. 10 for clarity).

The addition datapath in FPU 1st execution stage 56 includes a conventional alignment shifter 84 that shifts the mantissas of the operands (applied thereto on lines MANTA and MANTB), as required by additive instructions such as floating-point adds and subtracts. The distance of the shift necessary to align the two mantissas is provided by exponent selector 88, based upon one of the results EXPA−EXPB or EXPB−EXPA, depending upon which exponent is greater. Alignment shifter 84 is preferably a shift-right barrel shifter, which may be implemented in combination with a mantissa swapper (not shown) to reduce chip area. Alignment shifter 84 performs the shift of one or the other of the mantissas MANTA, MANTB as necessary, and provides outputs on lines ADD MANTA, ADD MANTB, CIN (carry in), and a sticky bit(not shown) for application to FPU 2nd execution stage 58. As is conventional in the art, the sticky bit is the logical OR of the bits shifted out of the end of alignment shifter 84, as used in rounding. Other conventional floating-point add hardware, such as a mantissa comparator to compute the sign of the result in effective subtraction events or to determine the larger of two NaN operands, and the like, may be provided in combination with alignment shifter 84.

According to this preferred embodiment of the invention, the multiplication datapath in FPU 1st execution stage 56 includes a conventional multiplier array 86, including a conventional Booth recoder (not shown) if desired. Lines MANTA, MANTB are also applied to multiplier array 86, which provides outputs on lines MPYSUM, MPYCARRY, CIN, and a sticky bit (not shown) to FPU 2nd execution stage 58, as is conventional in the art for floating-point multipliers. A preferred example of multiplier array 86 according to this example is a five level 72×72 bit carry save architecture multiplier array, alternating between 4,2 and 3,2 carry-save adders.

In addition to the lines and functions illustrated in FIG. 10, FPU 1st execution stage 56 is also capable of recognizing the exceptions of denormal operands, and special operands such as zero, infinity, NaN, and the like. These exceptions will typically be handled by FPU 1st execution stage 56 issuing a floating-point sequencer request, so that FPU sequencer 47 can handle the operands by way of a microcode sequence, in which case the floating-point pipeline will be aborted until the exception is handled.

FPU 2nd execution stage 58 includes exponent adjust circuit 94, including preferably a conventional leading bit estimator circuit to derive an exponent shift count that estimates the position of the leading bit of the result, for forwarding to normalization circuit 100 in the mantissa data path of FPU 3rd execution stage 60. The exponent value may also be incremented or decremented in exponent adjust circuit 94, the result of which is applied to FPU 3rd execution stage 60. In addition, the exponent values output from exponent adjust circuit is also forwarded to over/underflow detector 98, which generates underflow and overflow flags in floating-point status word FSW in the event of an exception.

The mantissas for the add and multiply cases are presented to adder 90, by way of multiplexers controlled by a control signal from the control pipeline (not shown) according to whether an add or multiply instruction is being executed. Adder 90, which is a conventional adder of the carry-propagate (CPA) type, receives the mantissa results from FPU 1st execution stage 56, and also a selected carry-in input. The result of the addition by adder 90 is presented to normalization circuit 100 in FPU 3rd execution stage 60. The sticky bits are also forwarded to rounding circuitry in FPU 3rd execution stage 60.

In FPU 3rd execution stage 60, normalization circuit 100 receives a shift count from FPU 2nd execution stage 58, and shifts the result of adder 90 by the shift count indicated, and also performs a fine shift as required. FPU 3rd execution stage 60 also includes rounding circuitry 106 that increments the normalized mantissa in order to calculate a rounded up value using one of several previously stored roundup entries, selected according to the precision mode for the instruction being executed. An appropriate rounding mask corresponding to a precision mode is also combined with the normalized mantissa (both with and without incrementing), with the appropriate value selected and applied as the mantissa result to result selector 115, under the control of a roundup signal from combinational logic that analyzes the states of the sign bit, LSB, guard bit, round bit, and sticky bit of the mantissa to determine whether the normalized mantissa is to be rounded.

The appropriate exponent value from FPU 2nd execution stage 58 are presented to multiplexer 115, as determined by the current operation and the values of the operands themselves. The sign bit is forwarded from the parallel floating-point status pipeline (not shown) directly to the sign bit location in result register 112.

As shown in FIG. 10, FPU 3rd execution stage 60 also includes quick ROM 110, which stores certain constants that are often used in floating-point operations, either as the result of an operation or in the event of an exception. For example, quick ROM 110 may store constants such as indefinite QNaN, zero, infinity (±), π and common fractions of it, and the largest representable number in each available precision format. Preferably, quick ROM 110 is implemented as two ROMs, one for each of the mantissa and exponent portions of the floating-point value. These constants may be accessed by address values generated by FPU 1st execution stage 56 that are applied to quick ROM 110 (on lines not shown in FIG. 10 for clarity).

Result selector 115 selects from between the calculated mantissa, sign, and exponent values and the output of quick ROM 110 for storing the results in result register depending upon the result of the instruction (i.e., whether or not an exception occurred). The contents of result register 117 are forwarded on writeback bus WB to FPU router 54 as discussed above relative to FIG. 2 and 5.

With completion of the operations of FPU 3rd execution stage 60, one pass in the performance of a floating-point instruction is complete. As described hereinabove, instruction completion operations are also handled by scheduler 50 and router 54 in FPU 31, without requiring intervention into or by the integer pipeline. Referring back to FIG. 5 in this regard, writeback bus WB is received by router portions 54a from which the results of FPU 3rd execution stage 60 are communicated to floating-point register file 52, for use in subsequent instructions launched by scheduler 50. In addition, writeback bus WB is also presented to router portion 54b, via which the results may be communicated to integer register file 39 on bus STORE_DATA, under the control of scheduler 50. As noted above, scheduler 50 follows a priority scheme by way of which writeback operations have the highest priority, as this reduces the possibility of resource dependencies or hazards.

As will be evident to those of ordinary skill in the art having reference to this specification, the present invention provides important advantages in the design and performance of microprocessors having on-chip floating-point execution units. These advantages arise from the immediate formatting of floating-point data words from the precision mode in which they are retrieved from memory into a higher precision format for use in the floating-point unit, without requiring storage of the data word in a register file. As a result, for many precision modes and thus many instructions, the applying of operands stored in memory to a floating-point routine may be accomplished in fewer machine cycles according to the present invention. Especially in those applications in which significant floating-point arithmetic is required, the present invention thus provides an important performance improvement in the microprocessor field.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor implemented into an integrated circuit, comprising:
   a memory for storing digital data words representing floating-point operands having mantissa and exponent portions;
   a first load/store unit for retrieving a selected floating-point operand from the memory and for placing the selected floating-point operand onto a first load/store bus in a first precision format; and
   a floating-point unit, for performing arithmetic data processing operations upon floating-point operands presented on the first load/store bus by the first load/store unit, comprising:
   a floating-point execution stage, for receiving at least one floating-point operand in an internal format having more bit positions than the first precision format, and for performing a data processing operation thereupon corresponding to a floating-point instruction;

a floating-point register, for storing floating-point operands;

a primary floating-point formatter, connected to the first load/store bus and to the floating-point register, for converting a floating-point operand received on the first load/store bus into the internal format and for storing the converted floating-point operand in the floating-point register;

an immediate formatter, connected to the first load/store bus and coupled to the execution stage, for receiving a floating-point operand on the first load/store bus in the first precision format, for converting the floating-point operand into the internal format, and for presenting the converted floating-point operand at an output; and a selection circuit, having inputs coupled to the floating-point register and to the output of the immediate formatter, for selectably presenting the contents of the floating-point register or the output of the immediate formatter to the floating-point execution stage.

2. The microprocessor of claim 1, further comprising:

a second load/store unit for retrieving a selected floating-point operand from the memory and for placing the selected floating-point operand onto a second load/store bus in the first precision format;

wherein the primary floating-point formatter is also connected to the second load/store bus, and is also for converting a floating-point operand received thereon into the internal format;

and wherein the immediate formatter is also connected to the second load/store bus, and is also for converting a floating-point operand received thereon into the internal format.

3. The microprocessor of claim 2, further comprising:

wherein the first and second load/store units are cooperatively operable to retrieve, from the memory, a floating-point operand in a second precision format for presentation on both said first and second load/store buses;

wherein the internal format has more bit positions than the second precision format;

and wherein the immediate formatter is also for converting the floating-point operand in the second precision format on the first and second load/store buses into the internal format.

4. The microprocessor of claim 3, wherein the operand in the second precision format is presented on the first and second load/store buses in the same machine cycle.

5. The microprocessor of claim 3, wherein the operand in the second precision format is presented on the first and second load/store buses in different machine cycles.

6. The microprocessor of claim 1, wherein the floating-point operand in the first precision mode comprises an operand sign, an operand exponent, and an operand mantissa;

and wherein the immediate formatter comprises a first path for communicating the state of a data line in the first load/store bus corresponding to the operand sign, the state of a plurality of data lines in the first load/store bus corresponding to the operand exponent, and the state of a plurality of data lines in the first load/store bus corresponding to the operand mantissa, to a first set of corresponding outputs arranged in the internal format.

7. The microprocessor of claim 6, wherein the first path of the immediate formatter includes a rebias circuit, coupled to the data lines in the first load/store bus corresponding to the operand exponent, for adding a bias difference value to the value of the operand exponent, and for presenting the result of the adding to the multiplexer as the operand exponent arranged in the internal format.

8. The microprocessor of claim 6, further comprising:

a second load/store unit for retrieving a selected floating-point operand from the memory and for placing the selected floating-point operand onto a second load/store bus in the first precision format;

wherein the primary floating-point formatter is also connected to the second load/store bus, and is also for converting a floating-point operand received thereon into the internal format;

wherein the immediate formatter is also connected to the second load/store bus, and is also for converting a floating-point operand received thereon into the internal format;

and wherein the immediate formatter further comprises a second path, for communicating the state of data lines in the second load/store bus corresponding to the operand sign, the state of a plurality of data lines in the second load/store bus corresponding to the operand exponent, and the state of a plurality of data lines in the second load/store bus corresponding to the operand mantissa, to a second set of corresponding outputs arranged in the internal format.

9. The microprocessor of claim 8, wherein the first and second load/store units are cooperatively operable to retrieve, from the memory, a floating-point operand in a second precision format presented on both said first and second load/store buses with the operand mantissa presented on the first load/store bus and on lines in the second load/store bus, the operand exponent presented on lines in the second load/store bus, and the operand sign presented on a line in the second load/store bus;

wherein the internal format has more bit positions than the second precision format;

and wherein the immediate formatter further comprises:

a third path, for communicating the state of data lines in the first and second load/store buses corresponding to the operand mantissa, the state of data lines corresponding to the operand exponent, and the state of the data line corresponding to the operand sign, to a third set of corresponding outputs arranged in the internal format.

10. The microprocessor of claim 9, wherein the representation of the operand exponent in each of the first and second precision formats and the internal format is biased by a bias value;

wherein the first path in the immediate formatter includes a rebias circuit, coupled to the data lines in the first load/store bus corresponding to the operand exponent bits, for adding a bias difference value to the value of the operand exponent, and for presenting the result of the adding to the multiplexer as the operand exponent arranged in the internal format;

and wherein the second and third paths in the immediate formatter each include a rebias circuit, coupled to the data lines in the second load/store bus corresponding to the operand exponent, for adding a bias difference value to the value of the operand exponent, and for presenting the result of the adding to the multiplexer as the operand exponent arranged in the internal format.

11. The microprocessor of claim 9, wherein the first and second load/store units are also cooperatively operable to retrieve, from the memory, a floating-point operand in the second precision format presented on the first and second load/store buses with the operand mantissa presented on the second load/store bus and on lines in the first load/store bus, the operand exponent presented on lines in the first load/store bus, and the operand sign presented on a line in the first load/store bus;

and wherein the immediate formatter further comprises:
a fourth path, for communicating the state of data lines in the first and second load/store buses corresponding to the operand mantissa, the state of data lines corresponding to the operand exponent, and the state of the data line corresponding to the operand sign, to a fourth set of corresponding outputs arranged in the internal format.

12. The microprocessor of claim 11, wherein the first and second load/store units are cooperatively operable to retrieve, from the memory, a floating-point operand in the second precision format presented on the first and second load/store buses with the operand mantissa presented on the second load/store bus in a first machine cycle, and with the operand mantissa presented on lines in the first load/store bus, the operand exponent presented on lines in the first load/store bus, and the operand sign presented on a line in the first load/store bus in a second machine cycle later than the first machine cycle.

13. The microprocessor of claim 12, further comprising:
snoop logic, for monitoring a sequence of signals corresponding to instructions executed by the microprocessor, and for encoding load signals corresponding to memory load instructions of floating-point operands onto a control bus, wherein the selection circuit in the floating-point unit selects one of the sets of outputs of the immediate formatter or the contents of the floating-point register to the floating-point execution stage responsive to the encoded load signals on the control bus.

14. The microprocessor of claim 1, further comprising:
snoop logic, for monitoring a sequence of signals corresponding to instructions executed by the microprocessor, and for encoding load signals corresponding to memory load instructions of floating-point operands onto a control bus, wherein the selection circuit in the floating-point unit selects the output of the immediate formatter or the contents of the floating-point register to the floating-point execution stage responsive to the encoded load signals on the control bus.

15. A method of operating a microprocessor to execute floating-point instructions upon floating-point operands retrieved from memory in a first precision format, and having a mantissa portion represented by a plurality of mantissa bits, an exponent portion represented by a plurality of exponent bits, and a sign indicator, comprising the steps of:

monitoring a sequence of instructions to detect a floating-point load instruction for an operand of the first precision format;

retrieving an operand from memory;

placing the retrieved operand onto a first load/store bus that is coupled to an immediate operand formatter;

operating a first path of the immediate operand formatter to communicate the sign indicator of the operand from the first load/store bus to a sign bit output, to add a bias difference value to the first bias of the exponent portion of the operand, to communicate the exponent portion resulting from the adding step to a plurality of exponent outputs greater in number than the plurality of exponent bits in the first format, and to communicate the mantissa portion to a plurality of mantissa outputs greater in number than the plurality of mantissa bits in the first format;

responsive to the monitoring step detecting a floating-point load instruction for an operand of the first precision format onto the first load/store bus, applying the outputs of the first path of the immediate operand formatter to a floating-point execution unit;

placing a retrieved operand in the first precision format onto a second load/store bus that is coupled to the immediate operand formatter;

operating a second path of the immediate operand formatter to communicate the sign indicator of the operand from the second load/store bus to a sign bit output, to communicate the exponent portion to a plurality of exponent outputs greater in number than the plurality of exponent bits in the first format, and to communicate the mantissa portion to a plurality of mantissa outputs greater in number than the plurality of mantissa bits in the first format;

responsive to the monitoring step detecting a floating-point load instruction for an operand of the first precision format on the second load/store bus, applying the outputs of the second path of the immediate operand formatter to the floating-point execution unit;

monitoring a sequence of instructions to detect a floating-point load instruction for an operand of a second precision format, and having a mantissa portion represented by a plurality of mantissa bits, an exponent portion represented by a plurality of exponent bits, and a sign indicator, to the first and second load/store buses;

placing the mantissa portion of the retrieved operand onto the first and second load/store buses;

placing the exponent portion and sign indicator of the retrieved operand onto the second load store bus;

operating a third path of the immediate operand formatter to communicate the sign indicator of the operand from the second load/store bus to a sign bit output, to communicate the exponent portion from the second load/store bus to a plurality of exponent outputs greater in number than the plurality of exponent bits in the second precision format, and to communicate the mantissa portion from the first and second load/store buses to a plurality of mantissa outputs greater in number than the plurality of mantissa bits in the second precision format;

responsive to the monitoring step detecting a floating-point load instruction for an operand of the second precision format onto the first and second load/store buses, applying the outputs of the third path of the immediate operand formatter to the floating-point execution unit.

16. The method of claim 15, further comprising:
monitoring a sequence of instructions to detect a floating-point load instruction for an operand of the second precision format, in swapped form, to the first and second load/store buses;

placing a portion of the mantissa portion of the retrieved operand onto the second load/store bus in a first machine cycle;

placing the remainder of the mantissa portion, the exponent portion, and the sign indicator of the retrieved operand onto the first load store bus in a second machine cycle after the first machine cycle;

operating a fourth path of the immediate operand formatter to communicate the sign indicator of the operand from the first load/store bus to a sign bit output, to communicate the exponent portion from the first load/store bus to a plurality of exponent outputs greater in number than the plurality of exponent bits in the second precision format, and to communicate the mantissa portion from the first and second load/store buses to a plurality of mantissa outputs greater in number than the plurality of mantissa bits in the second precision format;

responsive to the monitoring step detecting a floating-point load instruction for an operand of the second precision format onto the first and second load/store buses in swapped form, applying the outputs of the fourth path of the immediate operand formatter to the floating-point execution unit.

17. The method of claim 16, further comprising:

responsive to the monitoring step detecting a floating-point load instruction of an operand in a third precision format, applying the contents of a floating-point register to the floating-point execution unit.

18. A method of operating a microprocessor to execute floating-point instructions upon floating-point operands retrieved from memory in a selected one of a plurality of precision formats, each precision format having a mantissa portion represented by a corresponding plurality of mantissa bits, an exponent portion represented by a corresponding plurality of exponent bits, and a sign indicator, comprising the steps of:

monitoring a sequence of instructions to detect a floating-point load instruction for an operand;

retrieving an operand from memory;

placing the retrieved operand onto at least one load/store bus that is coupled to an immediate operand formatter;

simultaneously converting bits on the at least one load/store bus from each of the plurality of precision formats into a high precision internal format having a sign indicator, an exponent portion having plurality of exponent bits greater in number than a maximum number of exponent bits in the plurality of precision formats and a mantissa portion having a plurality of mantissa bits greater in number than a maximum number of mantissa bits in the plurality of precision formats, each conversion supplying a sign bit, a plurality of exponent bits and a plurality of mantissa bits from the at least one load/store bus according to a selected one of the plurality of precision formats to corresponding bits of one output bus of a plurality of output busses equal in number to a number of the plurality of precision formats;

responsive to the monitoring step detecting a floating-point load instruction selecting one of the output busses of the simultaneously converting step corresponding to a precision format of the operand.

19. The method of claim 18, wherein:

said plurality of precision formats includes a single precision format having a sign bit at a first predetermined location within a data word, a set of exponent bits having second predetermined locations within the data word and a set of mantissa bits having third predetermined locations within the data word;

said at least one load/store bus comprises first and second load/store buses; and said step of simultaneously converting bits on the at least one load/store bus from each of the plurality of precision formats into a high precision internal format includes:

(1) supplying a bit from the first predetermined location of the first load/store bus to a sign bit of a first output bus, adding a bias difference value to a set of bits from the second predetermined locations of the first load/store bus forming a first sum exponent, supplying the first sum exponent to a set of exponent bits of the first output bus, supplying a set of bits from the third predetermined locations of the first load/store bus to a set of most significant mantissa bits of the first output bus, and filling a set of least significant mantissa bits of the first output bus with zeros; and (2) supplying a bit from the first predetermined location of the second load/store bus to a sign bit of a second output bus, adding a bias difference value to a set of bits from the second predetermined locations of the second load/store bus forming a second sum exponent, supplying the second sum exponent to a set of exponent bits of the second output bus, supplying a set of bits from the third predetermined locations of the second load/store bus to a set of most significant mantissa bits of the second output bus, and filling a set of least significant mantissa bits of the second output bus with zeros.

20. The method of claim 18, wherein:

said plurality of precision formats includes a double precision format having a sign bit at a fourth predetermined location within a first data word, a set of exponent bits having fifth predetermined locations within the first data word and a set of mantissa bits having sixth predetermined locations within the first data word and seventh predetermined locations with a second data word;

said step of simultaneously converting bits on the at least one load/store bus from each of the plurality of precision formats into a high precision internal format includes:

(3) supplying a bit from the fourth predetermined location of the first load/store bus to a sign bit of a third output bus, adding a bias difference value to a set of bits from the fifth predetermined locations of the first load/store bus forming a third sum exponent, supplying the third sum exponent to a set of exponent bits of the third output bus, supplying a set of bits from the sixth predetermined locations of the first load/store bus to a first set of most significant mantissa bits of the third output bus, supplying a set of bits from the seventh predetermined locations of the second load/store bus to a second set of most significant mantissa bits of the third output bus, and filling a set of least significant mantissa bits of the third output bus with zeros; and (4) supplying a bit from the fourth predetermined location of the second load/store bus to a sign bit of a fourth output bus, adding a bias difference value to a set of bits from the fifth predetermined locations of the second load/store bus forming a fourth sum exponent, supplying the fourth sum exponent to a set of exponent bits of the fourth output bus, supplying a set of bits from the sixth predetermined locations of the second load/store bus to a first set of most significant mantissa bits of the fourth output bus, supplying a set of bits from the seventh predetermined locations of the first load/store bus to a second set of most significant mantissa bits of the fourth output bus, and filling a set of least significant mantissa bits of the fourth output bus with zeros.

* * * * *

UNITED STATES PATENT AND TRADEMARK OFFICE
CERTIFICATE OF CORRECTION

PATENT NO: 5,940,311

DATED: 8/17/99

INVENTOR(S): Tuan Q. Dao, Rekha Suryanarayana, Naoki Hayashi

It is certified that error appears in the above-identified patent and that said Letters Patent are hereby corrected as shown below:

Cover Page, insert Item [60] under Related U.S. Application Data

--Provisional Application No. 60/016,503 April 30, 1996.--

Signed and Sealed this

Twenty-ninth Day of May, 2001

Attest:

NICHOLAS P. GODICI

Attesting Officer

Acting Director of the United States Patent and Trademark Office